Oct. 3, 1939.   G. A. HORMEL   2,174,746
APPARATUS FOR TREATING MEAT
Filed Sept. 15, 1937   2 Sheets-Sheet 1

Inventor:
George A. Hormel,
By Cromwell ........
Attys.

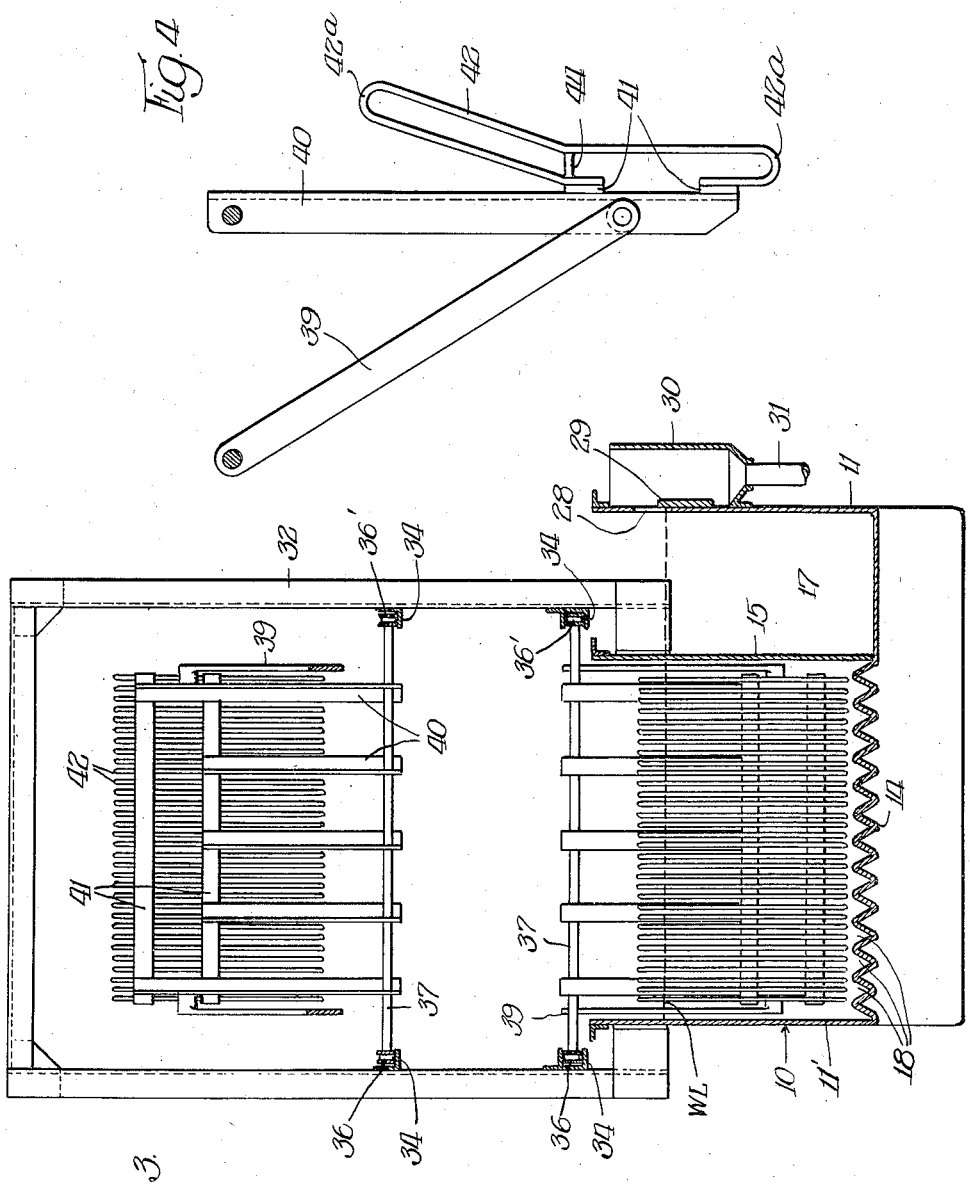

Patented Oct. 3, 1939

2,174,746

UNITED STATES PATENT OFFICE 2,174,746

APPARATUS FOR TREATING MEAT

George A. Hormel, Los Angeles, Calif., assignor to Geo. A. Hormel & Company, Austin, Minn., a corporation of Delaware Application September 15, 1937, Serial No. 163,965

6 Claims. (Cl. 146—194)

This invention relates to meat packing and pertains particularly to apparatus for washing or otherwise treating pieces of meat with liquid preliminary to racking for smoking or the like.

In the curing of various meat products, bacon and ham for example, the suitably dressed pieces of meat are customarily put down in a pickle or cure which contains, for example, salt and various other ingredients, and left therein for a considerable period of time at a relatively low temperature, e. g., 40° F. After being subjected to the cure for a suitable length of time, the pieces are removed from it and are hung on racks which are placed in the smoke house wherein the pieces are subjected to the smoking treatment.

Preliminary to the racking of pieces, it is desirable to subject them to a washing treatment for the purpose of removing excess of the curing materials from their surfaces and surface portions and for the purpose of cleansing them. It is also sometimes desirable to soften the pieces somewhat from the stiffened or hardened condition which results from the low temperature of the cure, to facilitate the racking and to permit the pieces to take a proper shape and to be more readily penetrated by the smoke.

The general object of the present invention is to provide an apparatus whereby pieces of meat may be thoroughly washed and conditioned for racking rapidly and uniformly.

Another object is the provision of apparatus whereby large quantities of meat may be suitably washed in a day in a comparatively small space, and more thoroughly and with less manual handling than has been the case in general practice heretofore.

Other and further objects of the invention will be pointed out or indicated hereinafter or will be apparent to one skilled in the art upon an understanding of the invention or its employment in use.

For the purpose of aiding in an explanation of the invention I show in the accompanying drawings forming part of this specification one form of apparatus in which it may be embodied and practiced. It is to be understood, however, that this is presented merely for purpose of illustration and is not to be interpreted in any fashion calculated to limit the appended claims short of the true and most comprehensive scope of the invention in the art.

In the drawings:

Fig. 3 is a transverse vertical section, on an enlarged scale, approximately on line 3—3 of Fig. 1; and Fig. 4 is a side elevational view of one of the conveyor paddles or flights constituting a portion of the apparatus illustrated in Figs. 1 and 3.

Figure 1:
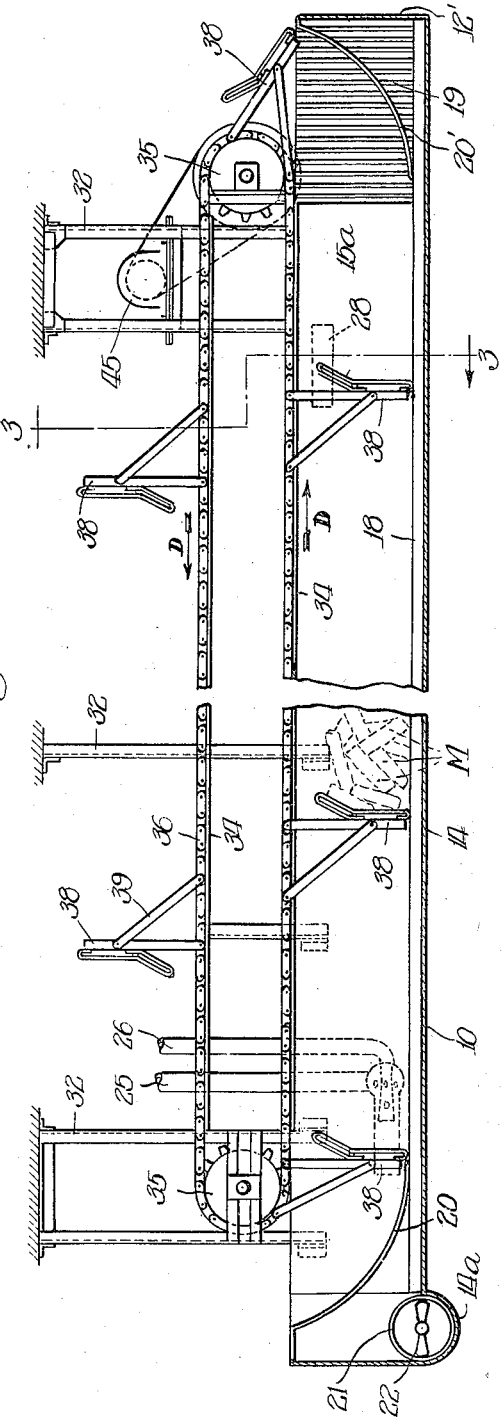
Fig. 1 is a side view of an apparatus embodying the invention, the same being partly in elevation and partly in section.
Figure 2:
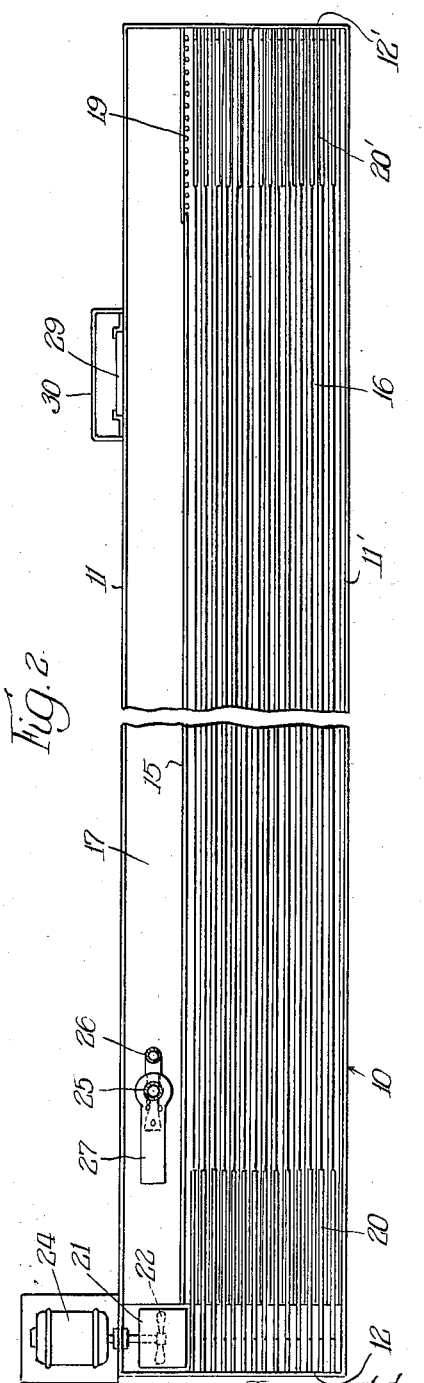
Fig. 2 is a top or plan view of the tank portion of the apparatus illustrated in Fig. 1.

An understanding of the nature of the invention will be most quickly had from a detailed description of the construction and operation of the illustrative apparatus shown in the drawings, as follows:

The apparatus comprises a long and relatively narrow tank, designated generally by the reference numeral 10 of a total length of say 60 feet and over-all width of say 4½ feet, said tank having parallel side walls 11 and 11', end walls 12 and 12' and a bottom wall 14. A longitudinal partition 15, which is spaced at its ends from the end walls 12 and 12', subdivides the trough of this tank into a treating compartment 16 and a return flow compartment 17. The bottom of the treating compartment is corrugated or otherwise formed so as to provide a series of channels 18 which are open at their tops and which extend parallel with one another longitudinally of the treating compartment. The side walls 11' and 15 of the treating compartment may be likewise corrugated or formed with longitudinally extending channels. The end of the tank which is closed by the wall 12 will be referred to as the charging end and the end closed by the wall 12' will be referred to as the discharge end. At the discharge end, the space between the terminus 15a of the partition 15 and the end wall 12' is screened by a grating 19, thus affording a passageway from the treating compartment 16 into the return flow compartment 17. In each end of the treating compartment is disposed a grating, designated respectively 20 and 20', which gratings are made up of curved rods extending longitudinally of the tank from the bottom to the top of the treating compartment.

At the charging end of the tank, a portion of the bottom wall 14 is offset downwardly, in semi-cylindrical form, as shown at 14a in Fig. 1, and in this downwardly offset portion, at the end of the partition 15, is disposed a short sleeve 21, within which sleeve is disposed a rotary impeller 22 which is arranged to be operated by a suitable variable speed driving means 24.

A water supply pipe 25 and a steam supply pipe 26 are arranged to discharge into a mixing device 27 which is disposed in the lower portion of the return flow compartment 17 adjacent the charging end of the tank. Adjacent the discharge end of the tank, the side wall 11 is provided in its upper portion with a discharge opening 28 (see Figs. 1 and 3) and equipped with a vertically adjustable closure member 29 whereby the effective bottom level of the aperture may be varied. The funnel 30, which leads to a discharge pipe 31, is arranged to receive the effluent which passes through the aperture 28.

Along the tank is disposed a series of frames 32 which are rigidly attached at their upper ends to the building structure and at their lower ends to the side walls of the tank.

On these frames are carried chain guides or track ways 34 which extend in parallel relationship longitudinally of the tank. Also supported by certain of the frames 32 are chain sprockets 35 disposed in pairs over and adjacent the ends of the treating compartment and in alignment with the chain guides. Endless conveyor chains 36 and 36' are entrained with the sprockets and carried on the chain guides or track ways 34 over and along the opposite sides of the treating compartment.

The oppositely disposed chains are connected at intervals by rods 37 which extend transversely above the treating compartment, and on certain of these rods, at appropriate intervals, are hinged the paddles or flights 38. These paddles are stayed or braced by bars 39, each of which has a hinge connection at one end with a paddle and at the other end with a rod 37 which is mounted in links of the chains 36 at a suitable distance from those to which the paddle is connected.

The construction of the paddles is illustrated in Figs. 3 and 4. Each comprises a plurality of longitudinal angle bar strips 40 connected by transverse strips 41 and a plurality of rods 42 mounted in parallel relationship to one another on the strips 41. Each of the rods 42 is shaped as illustrated in Fig. 4 so as to form bends 42a at its extremities, the ends of the rod being welded to the strips 41 and the intermediate portions being braced by spacers or struts 44. Accordingly, the rods 42, in their side by side relationship form a grating at the forward side of the paddle at some distance from the strips 40 and 41.

One of the sprockets 35 on which the chains 36 are entrained is actuated by a suitable variable speed driving means 45 to move the chains and paddles in the directions indicated by the arrows D. The paddles are thus moved along in positions substantially at right angles to the chains, and due to the hinge connections between the paddles and their stay bars 39 and the chains, the paddles are enabled to move around the sprockets, as illustrated at the right hand end of Fig. 1.

In the operation of the apparatus, the tank is filled to a suitable depth, as indicated by the water level WL in Fig. 3, with water which is introduced by way of the water line 25 and heated to a desired temperature by steam introduced through the steam line 26. The impeller 22 is set in operation, and the driving means 45 is energized to operate the conveyor formed of the chains 36 and paddles 38, thus to move the paddles longitudinally of the treating compartment from its charging end to its discharging end. A suitable number of pieces of meat which are to be washed or treated is placed in the charging end of the treating compartment in advance of each of the paddles as they come around, and, incident to the progressive movement of the paddles, the several groups of pieces of meat are propelled by them, in spaced relationship one after another, along through the water in the treating compartment to the discharge end thereof, and up along the grating 20' until they are discharged from the discharge end of the tank onto a suitable conveyor. Incident to the progressive movement of the pieces of meat through the water in the treating compartment, excess curing material and loose scraps or other materials adhering to the pieces are washed off of them, so that they are discharged from the treating compartment in a suitably cleaned condition. Moreover, incident to their passage through the warm water in the treating compartment, the pieces of meat are softened somewhat and rendered suitably pliant so that upon being discharged from the treating compartment they are in condition to be properly flattened, branded and impaled on the racking hooks.

The grating-like form of the paddles permits the liquids in the feeding compartment to pass freely through them and among the pieces of meat, so that the latter are subjected to a continuous flow action of water.

The body of water in the tank is maintained in continuous circulating movement by the action of the paddles and the impeller 22. The water passes from the treating compartment into the return flow compartment 17 through the grating 19 at the discharge end of the tank, and from the return flow compartment 17 into the treating compartment 16 through the space between the end of the partition 15 and the end wall 12 at the charging end of the tank. Incident to the recirculation of the water through the return flow compartment 17, it may be reheated to the desired temperature by steam introduced through the supply line 26 and mixing device 27, and fresh water may be supplied through the water line 25, either continuously or from time to time, the excess water being discharged through the discharge orifice 28 and carrying with it floating debris.

The provision of the longitudinal channels 18 in the bottom of the treating compartment, and also in the side walls thereof if desired, affords flow passages for travel of water past the paddles and past the collections of pieces of meat which are being propelled by the paddles. Depending on the relative speeds of the impeller 22 and the conveyor, the rate of flow through these channels may be regulated so that it is either faster or slower than the progress of the meat, as desired. The provision of the channels therefore assists in the equalization of the temperature and freshness of the water throughout the length of the treating compartment. The presence of these channels also reduces the possibility of the liquid being piled up ahead of the advancing paddles to the point where it might overflow the tank, as in cases where the movement of the conveyor is fairly rapid and there is a large group or number of pieces of meat ahead of a paddle. Such welling up of the liquid at the discharge end of the tank, incident to the progressive movement of the paddles and groups of pieces, is avoided by the arrangement of the return conduit alongside the treating compartment and the free and open communication between the two at that end, so that the liquid has an immediate flow-off from the treating compartment into the return flow compartment, in case the water level in the former should be suddenly raised at the discharge end, as by the approach of a paddle carrying a large collection of pieces of meat before it.

It will be appreciated that by virtue of the procedure thus conducted, the meat is subjected to a very rapid washing action, each piece being brought into contact with a relatively large volume of water in the course of its travel, and that because of the fact that the meat is maintained in continuous movement while in the water, foreign matter is not permitted to deposit on it.

Another advantage resulting from the employment of this apparatus and method is that the meat is not left in the water for an excessive length of time, but only long enough to obtain the desired washing and warming effects. Because of the fact that the meat is thus effectively washed in a comparatively short period of time, plus the fact that the meat may be continuously charged into the treating compartment at the charging end and is automatically discharged at the discharge end, a large quantity of meat may be properly washed in a relatively short space of time and with uniform treatment.

What I claim is:

1. Apparatus for treating meat comprising, in combination, a tank affording an elongate trough-like treating compartment adapted to hold liquid, a return-flow conduit extending longitudinally of the treating compartment and in open communication with it at its ends so that liquid may circulate through them in series, a conveyor having foraminous paddles disposed at intervals longitudinally of the treating compartment and each extending across substantially the entire width thereof, at least one of the longitudinal walls of the treating compartment being provided with a plurality of relatively narrow channels extending longitudinally of said compartment and opening inwardly thereof only and affording passages for flow of liquid past the paddles therein, means for operating said conveyor to move said paddles progressively into the treating compartment at one end thereof, then through the length thereof, then out of it at its other end, and means for inducing flow of liquid from the return-flow conduit into the treating compartment at the end at which the paddles enter.

2. Apparatus for treating meat comprising, in combination, a tank affording an elongate trough-like treating compartment adapted to hold water and pieces of meat, a return-flow conduit extending longitudinally of said treating compartment and in open communication with it at its ends, conveyor means for propelling loose pieces of meat longitudinally in said treating compartment and comprising a plurality of paddles which travel closely adjacent the longitudinal walls of the compartment and push the pieces of meat ahead of them, said compartment having at least one of its longitudinal walls formed with narrow channels extending lengthwise thereof and opening inwardly in said compartment only, and means other than said paddles for inducing progressive flow of water in a circuit longitudinally in said return-flow conduit and said treating compartment in series, said channels affording by-passages for flow of water in said circuit past the paddles and pieces of meat.

3. Apparatus for treating meat as specified in claim 2 and wherein the paddles are of foraminous construction so as to permit passage of water through them and minimize their propulsive effect on the water.

4. Apparatus for treating meat as specified in claim 2 and wherein the flow-inducing means is arranged to induce flow of water in the direction in which the paddles move in the treating compartment.

5. Apparatus for treating meat as specified in claim 2 and including means for applying heat to the water in the return-flow conduit so that it may be delivered to the treating compartment at a higher temperature than it had when it left same in the course of its circulation.

6. Apparatus for treating meat as specified in claim 2 and including means for supplying additional water to the return-flow conduit adjacent the end where the water passes from it into the treating compartment, the flow-inducing means being disposed adjacent said end, and a discharge passage is provided adjacent the other end of the tank to permit flow-off of water therefrom adjacent the place where water flows from the treating compartment into the return-flow conduit.

GEORGE A. HORMEL.